O. E. BUCKLEY.
APPARATUS FOR EXHAUSTING TO LOW PRESSURES.
APPLICATION FILED DEC. 3, 1917. RENEWED APR. 22, 1920.
1,371,734.
Patented Mar. 15, 1921.
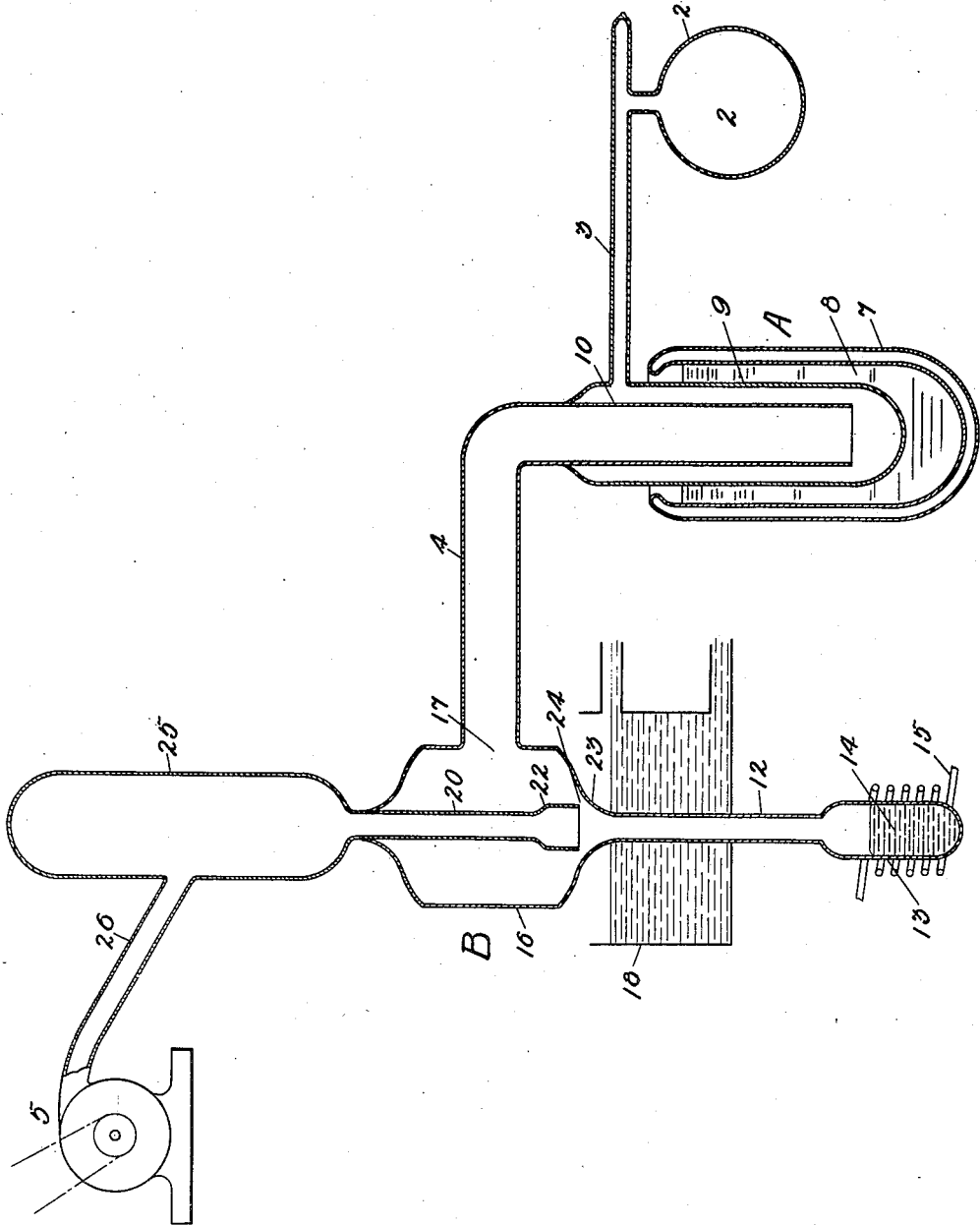
Inventor:
Oliver E Buckley
by J. G. Roberts Atty

UNITED STATES PATENT OFFICE.

OLIVER E. BUCKLEY, OF MAPLEWOOD, NEW JERSEY, ASSIGNOR TO WESTERN ELECTRIC COMPANY INCORPORATED, OF NEW YORK, N. Y., A CORPORATION OF NEW YORK.

APPARATUS FOR EXHAUSTING TO LOW PRESSURES.

1,371,734.  Specification of Letters Patent.  Patented Mar. 15, 1921.

Application filed December 3, 1917, Serial No. 205,258. Renewed April 22, 1920. Serial No. 375,908.

*To all whom it may concern:*

Be it known that I, OLIVER E. BUCKLEY, a citizen of the United States, residing at Maplewood, in the county of Essex and State of New Jersey, have invented certain new and useful Improvements in Apparatus for Exhausting to Low Pressures, of which the following is a full, clear, concise, and exact description.

This invention relates in general to apparatus for exhausting gas containing vessels to low pressures, and particularly to apparatus of this kind in which the gas from the vessel to be exhausted is entrained in a vapor stream.

In my copending application, Serial No. 96,265, filed May 8, 1916, and assigned to the same assignee as the present application, I have referred to my discovery that in apparatus of the kind above mentioned the introduction into the vapor stream of the gas from the vessel to be exhausted is facilitated by the previous removal from the vapor stream of substantially all of the molecules which are not moving in directions substantially parallel to the direction of stream flow. In the present application, it is my intention to describe and claim another new and improved form of apparatus for exhausting to low pressures, in which this discovery is utilized.

The aforesaid prior application describes and claims an apparatus in which the vapor molecules moving in paths not substantially parallel to the direction of stream flow are removed from the vapor stream by the cooling of the vapor conduit in advance of the place at which the gas is introduced into the vapor stream; and in that particular apparatus the cooling jacket extends from a point in advance of to a point beyond the place where the vapor and gas conduits unite. In the apparatus hereinafter described, however, a different construction and arrangement of parts are provided, and the cooling of the walls of the vapor carrying conduit is confined to a portion in advance of the point at which the gas is introduced into the vapor stream.

The preferred embodiment of the present invention is shown, to a certain extent diagrammatically, in the accompanying drawing.

A vessel 2 to be exhausted is connected to a conduit 3, which conduit is connected through a liquid air-trap A, of well-known form, to a conduit 4 leading to the vapor pump B. The discharge side of the vapor pump is connected to a "fore" or "roughing" pump 5 of any suitable type. The liquid air-trap A comprises, as is usual, a double-walled vessel 7, the space between the walls being exhausted to fairly low pressure. The vessel 7 contains liquid air 8 into which dips the enlarged closed end 9 of the conduit 3, into which enlarged end extends the end 10 of the conduit 4.

The vapor pump B, forming the subject matter of this invention, comprises a conduit 12 leading from a bulb 13 containing mercury, or other suitable liquid, 14. A heating coil 15 or other appropriate means may be used to vaporize the mercury. The upper end of conduit 12 opens centrally into the bottom of chamber 16, into one side of which the gas conduit 4 opens at 17. Below its connection to the chamber 16, the conduit 12 is surrounded by a water jacket or other cooling means indicated at 18. The conduit 20 is of approximately the same diameter as the conduit 12 and extends downwardly through the chamber 16 substantially in line with the conduit 12 and with its enlarged lower end 22, terminating within a short distance of the throat 23, forming the upper or discharge end of the conduit 12. There is thus left between the conduits 12 and 20, an unobstructed annular space 24 through which the gas enters the vapor stream. The upper end of the conduit 20 opens into the chamber 25, from which tube 26 leads to the "roughing" pump 5.

The operation of the above described apparatus is as follows: When the mercury 14 is heated, mercury vapor is produced which the walls of bulb 14 and conduit 12 form into a stream flowing upwardly through the conduit 12; since the molecules in this stream, though moving as a mass parallel to the axis of conduit 12, yet have in most cases greater or less translatory movements transverse to said axis and thus to the direction of stream flow, there is a tendency for the vapor to diffuse laterally. These transverse translatory movements of the molecules are, in the particular form of device herein illustrated, canceled in the following manner. As the vapor stream passes upward through the portion of conduit 12 which is surrounded by the water jacket 18, those mercury vapor molecules whose directions of movement are not substantially parallel to the direction of stream flow, that is, substantially parallel to the walls of the conduit 12, impinge upon the cooled walls of the conduit and are condensed and removed from the vapor stream, eventually flowing down the walls of the conduit 12 back into the bulb 13. As a consequence, the vapor stream emerging from the upper end of the conduit 12 consists almost entirely of molecules moving substantially parallel to the direction of stream flow and therefore there is practically no tendency for the vapor to diffuse into the chamber 16. Such molecules offer no opposition to the flow of gas molecules into the vapor stream, but, on the contrary, engage with said gas molecules and carry them along into the conduit 20 and on to the chamber 25, where most of the mercury vapor condenses and flows back through the conduits 20 and 12 to the bulb 13. The vapor stream leaving the conduit 12 thus forms an effective fluid piston. From the chamber 25, the gas molecules pass out through the conduit 26 and the "roughing" pump 5. The liquid air-trap A acts in the usual way to condense such mercury vapor as may escape from the mercury stream into the chamber 16 and work back through the conduit 4 to that point; and it also serves to condense vapors coming from the vessels to be exhausted.

What is claimed is:

1. In apparatus for exhausting gas containing vessels to low pressures, the combination with means for producing a vapor stream of means for eliminating from said vapor stream substantially all molecules not moving in paths substantially parallel to the direction of stream flow, a conduit for receiving said vapor stream, and means connected with the vessel to be exhausted for introducing gas molecules from said vessel into said vapor stream before it passes into said conduit.

2. In apparatus for exhausting gas containing vessels to low pressures, the combination with a source of vapor, of a conduit through which said vapor passes, means for cooling the walls of said conduit and thereby removing from the vapor stream substantially all molecules not moving in paths substantially parallel to the direction of stream flow, a second conduit for receiving said vapor stream, and means connected with the vessel to be exhausted for introducing the gas molecules from said vessel into said vapor stream at the point where it passes from said first named conduit into said second named conduit.

3. In apparatus for exhausting gas containing vessels to low pressures, the combination with a source of vapor, of a conduit through which said vapor passes, means for cooling the walls of said conduit and thereby removing from the vapor stream substantially all molecules not moving in paths substantially parallel to the direction of stream flow, a chamber with which the mouth of said conduit communicates, a second conduit connected with said chamber and arranged to receive the vapor stream from said first named conduit, and a third conduit for connecting said chamber with the vessel to be exhausted, whereby the gas molecules from said vessel are introduced into said vapor stream at the point where it passes from said first named conduit into said second named conduit.

4. In apparatus for exhausting gas containing vessels to low pressures, the combination with a source of vapor, of a conduit through which said vapor passes, means for cooling the walls of said conduit, a chamber with which the mouth of said conduit communicates, a second conduit projecting into said chamber and arranged substantially in line with said first named conduit whereby the vapor stream passes from said first named conduit into said second named conduit, and a third conduit for connecting said chamber with the vessel to be exhausted.

5. In apparatus for exhausting gas containing vessels to low pressures, the combination with a source of vapor, of a conduit through which said vapor passes, means for cooling the walls of said conduit, a chamber with which the mouth of said conduit communicates, a second conduit having an enlarged mouth and extending into said chamber and arranged substantially in line with said first named conduit whereby said second named conduit receives the vapor stream from said first named conduit, and a third conduit for connecting said chamber with the vessel to be exhausted.

In witness whereof I hereunto subscribe my name this 10th day of January, A. D. 1918.

OLIVER E. BUCKLEY.